Nov. 12, 1957 R. M. CHAVENEAUD 2,812,901

SIGN INSERTION DEVICES IN CALCULATING MACHINES

Filed Dec. 8, 1952

Inventor:
Roger Marcel Chaveneaud
Attorneys:
Baldwin & Wight

United States Patent Office 2,812,901
Patented Nov. 12, 1957

2,812,901

SIGN INSERTION DEVICES IN CALCULATING MACHINES

Roger Marcel Chaveneaud, Levallois Perret, France, assignor, by mesne assignments, to Etablissement Martin-Vernon, Vaduz (Liechtenstein)

Application December 8, 1952, Serial No. 324,683

Claims priority, application France December 11, 1951

9 Claims. (Cl. 235—1)

The present invention aims at improvements in or relating to mechanical or electro-mechanical computing machines, and its object is to provide improved mechanism for indicating the position of the decimal point in a value entered in a register.

In many known computing machines which carry out the four operations, addition, subtraction, multiplication, division, the location of the point, i. e. of the number of decimal places in a value entered in a register, is indicated by a movable slide or other device.

An object of the present invention is to provide an improved mechanism or device associated in a novel way with the numeral wheels of a computing machine register for indicating the location of the decimal point in a value entered in the register. In accordance with the invention, mutually spaced coaxial discs bearing decimal point markings are disposed respectively in the interspaces between the ordinally spaced coaxial numeral wheels of a register, and means is provided for rotating the discs conjointly.

The set of conjointly rotatable discs is marked with decimal point indications arranged on a helix enveloping the peripheries of the discs, the point indications being spaced apart by a distance equal to that separating two adjacent decimal places or orders in the register.

The present invention also aims at ensuring, when reading the value entered in the register, the presence of commas separating numbers in portions of three digits from the decimal point.

The invention is described with reference to the accompanying drawings, wherein.

Figure 1:
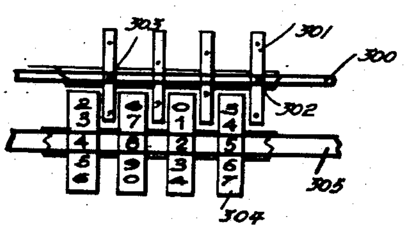
Figure 1 is an elevation of a device embodying the invention in one form.

In the construction shown in Figure 1, mutually spaced coaxial discs 301 secured to an axle or shaft 300 are marked with point signs arranged along a helix on the peripheries of the discs. The axle 300 is arranged sufficiently close to the axle 305 of the digit wheels 304 so that point indicator discs 301 are interspaced between the digit wheels so as to facilitate reading. An end portion of the shaft or axle 300 may serve as a manually or otherwise operable means for rotating the discs 301 conjointly.

Figure 2:
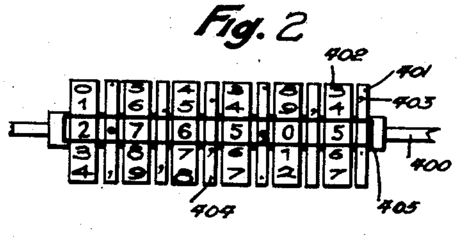
Figure 2 is an elevation of a device embodying the invention in a different and preferred form.

Figure 2 illustrates another type of embodiment in which the axis of discs 404 corresponding to the discs 301 shown in Figure 1 is coincident with the axis of the digit wheels 402. It will be seen from Figure 2 that the discs 404 are fast with the axle 400 on which the digit wheels 402 are mounted free. The diameters of the discs 404 and digit wheels 402 are substantially equal thus allowing the points 401 to be placed between the digits, in the usual manner. Again, the decimal point indications or signs 401 are arranged along a helix on the peripheries of the discs 404. The discs 404 are rotatable conjointly, by any suitable means. For example, an end portion of the shaft 400 may serve as a manually or otherwise operable means for rotating the discs.

In order to facilitate the reading of the numbers which may be carried by the digit series, commas (403 in Figure 2), are provided for separating the digit series into portions of three figures starting from the point, and the commas are spaced three decimal places apart, starting from the point, and are carried by the same element as the latter. They thus move with respect to the digit wheels in the same manner as the point. The points 401 and the commas 403 may be viewed through a window 405.

What I claim is:

1. In a computing machine, the combination of a register for values involved in computations and including a plurality of ordinally spaced coaxial rotatable numeral wheels; a plurality of mutually spaced coaxial discs disposed respectively in the interspaces between said numeral wheels and bearing indicating signs for marking off separations of adjacent order numerals registered by said register; means mounting said discs for conjoint rotation about an axis extending in the direction of extent of the axis of rotation of said numeral wheels; and means for rotating said discs conjointly to effect disposition of the signs thereon between values in said register.

2. A combination as set forth in claim 1 in which the indicating signs on each of a plurality of said discs include a decimal point and a comma.

3. A combination as set forth in claim 2 in which the decimal points on said plurality of discs are arranged on a plurality of turns of a helix, and in which the commas on said plurality of discs are arranged on a helix.

4. A combination as set forth in claim 1 in which the indicating signs on each of a plurality of said discs include a plurality of peripherally spaced decimal points separated from one another by a plurality of commas.

5. A combination as set forth in claim 1 in which said indicating signs include a single decimal point on each of a plurality of said discs, said decimal points being arranged between said numeral wheels on a helix.

6. A combination as set forth in claim 1 in which said indicating signs include a plurality of regularly spaced decimal points on each of a plurality of said discs, the decimal points on said plurality of discs being helically disposed with respect to one another.

7. A combination as set forth in claim 1 in which the means mounting said discs for rotation comprises a shaft fast with said discs, said numeral wheels being mounted for rotation on and with respect to said shaft.

8. A combination as set forth in claim 1 in which said numeral wheels and said discs are rotatable about a common axis.

9. A combination as set forth in claim 1 in which said discs are rotatable about an axis spaced from and parallel to the axis of rotation of said numeral wheels, said discs respectively extending into interspaces between said numeral wheels.

References Cited in the file of this patent

UNITED STATES PATENTS

| | | |
|---|---|---|
| 1,799,037 | Bley | Mar. 31, 1931 |
| 2,329,190 | Ellerbeck | Sept. 14, 1943 |
| 2,329,218 | Reynolds | Sept. 14, 1943 |

FOREIGN PATENTS

| | | |
|---|---|---|
| 337,862 | Germany | June 9, 1921 |